JAMES M. CLARK'S
Portable Post & Rail Fence.
No. 71278
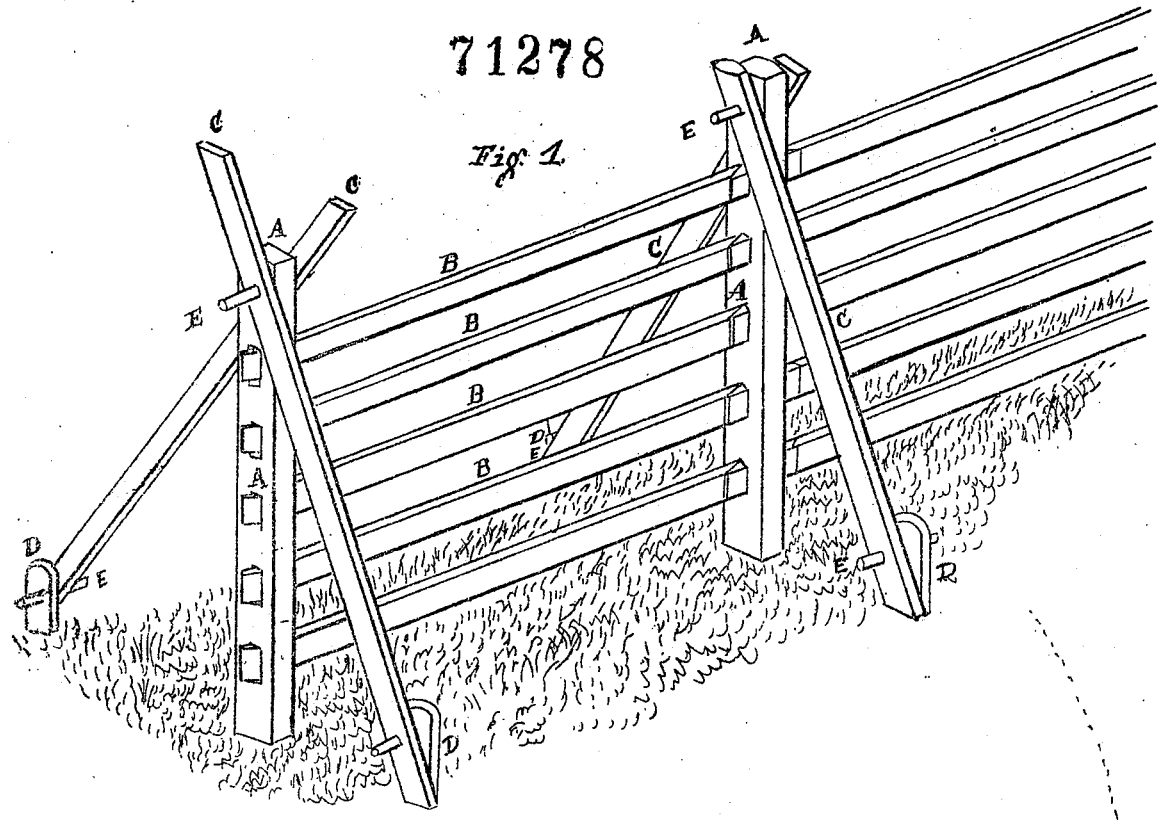
PATENTED NOV 26 1867
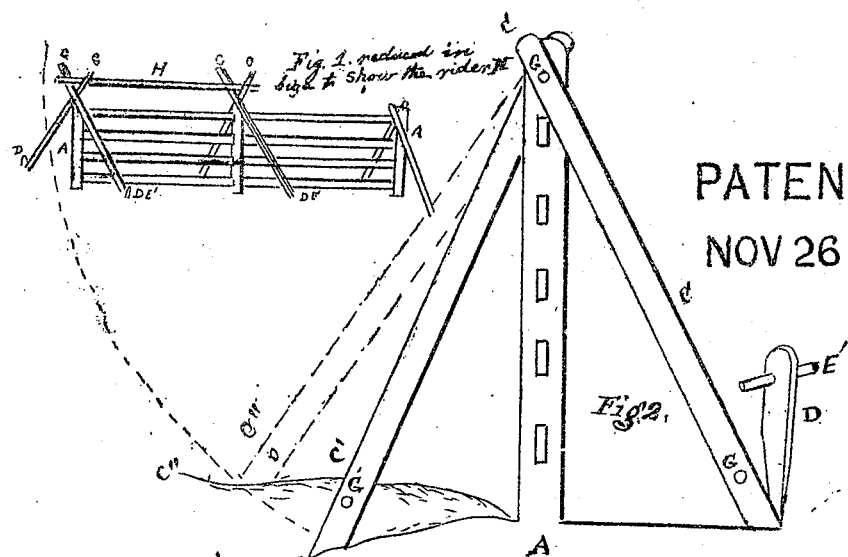
Witness at Signings
Wm. B. Wiley
Jacob Stauffer
James M. Clark

United States Patent Office.

JAMES M. CLARK, OF LANCASTER, PENNSYLVANIA.

Letters Patent No. 71,278, dated November 26, 1867.

IMPROVEMENT IN PORTABLE FENCE.

*The Schedule referred to in these Letters Patent and making part of the same.*

TO ALL WHOM IT MAY CONCERN:

Be it known that I, JAMES M. CLARK, of Lancaster, in the county of Lancaster, and State of Pennsylvania, have invented a new and improved Mode for Constructing a Substantial Portable Post-and-Rail Fence; and I do hereby declare that the following is a full and exact description thereof, reference being had to the accompanying drawing, making a part of this specification, in which—

Figure 1 is a perspective view of a portion set up.

Figure 2 illustrates the action of the braces on their pivot and securing-pins, both for turning over and adaptations to the fall or rise of the ground.

The object of my invention consists, mainly, to enable farmers to utilize posts rotten at their base, and usually consigned to the wood-pile as fuel, while the upper portions are sound and calculated to endure for a term of years out of the ground; or one-third of timber is saved in using new posts, and forms a straight, permanent fence, which will admit the soil to be cultivated as closely up to the fence as in the ordinary post-and-rail fence, while at the same time it is perfectly portable, and is easily shifted from one location to another.

To enable any one to make and use my invention, it is only necessary to say that when old posts are used, the rotten butts are sawed or cut off. A hole of the desired diameter is bored through the top, in the direction of the mortise, for the rails. This is all that is required to fit the post for use. For side braces, C, pieces of rails, or simply split timber, of the requisite length, are provided, and a hole, C', near the top and bottom, bored through each piece. Shorter pieces, D, pointed with the ordinary axe or hatchet, are provided for each brace, also with a hole, bored with the same auger used for the braces and posts.

Now all that is required is a supply of pivots or pins, of sufficient length and thickness, made of hard wood, or its equivalent, to form a hinge, and you are ready, single-handed, to plant your fence. Erect your post A with a pin, E, in hand, attach the brace C above, on one side, with the pin through it and the post, and it will stand till you attach the other brace, on the opposite side and in the opposite direction, till it drops with its lower end on the ground. Adjust the post to a perpendicular position. Now take your short stake D, with its hole in a line with the hole in the bottom of the brace, and perpendicular to it, insert and drive it into the soil till both holes match, then insert your pin, and unite the two in like manner with each post and the braces. It will be observed that a tap on the stakes will act as a dog on a saw-log, not only fetching the braces down firmly to the ground, but the post along with them, in a manner to give an unyielding firmness and stability to the fence. It is verily believed that it cannot be surpassed by any other mode of bracing, and has advantages that fixed braces, fashioned letter A-shape, (by uniting the braces by a cross-piece,) cannot have, nor when the braces are held by a band or spiked to the posts permanently. This mode of using pins will enable all the braces to swing to the opposite side of the fence, by simply drawing the lower pins and pulling up the stakes along the line, for ploughing or cultivating the field on that side. The fence will stand sufficiently firm with braces on one side. When the cultivation is completed, the braces are readily turned back to their place, and the stakes driven down and secured as before, in a very short time and with little labor, without the waste of ground, as when zigzag fences or wide-spreading braces or base-logs are used, as in numerous other portable fences, whether wire braces are used or wooden ones.

Those who prefer utility and economy to show, can make use of any off-falls or common timber, the rails being of the common kind; or if such as were in previous use, decayed ends can be cut off and a shorter panel made. Nevertheless, those preferring it can make quite as neat a fence on this plan as on any other in general use.

I would add that when posts have become too short, the braces may project above beyond the post, and a rider or top rail, H, can be laid from one cross-pair to the other, as shown in fig. 1, reduced.

I am aware that the whole is so simple that any wood-chopper can make his own fence. Its utility, cheapness, and adaptation to the soil are just what the farmer wants; and simple and useful as it is, I am not aware that this arrangement has ever before been known or thought of.

Having a large number of posts with decayed butts, I put my faculties to work, how to utilize them, and after mature reflection adopted the foregoing plan, and have put up a fence that has astonished my neighbors by its simplicity and great firmness; so much so as to convince them that digging holes and wasting timber by inserting into the soil to rot was a useless waste of materials.

The peculiar dog-like action of my combined brace and stake upon the posts to give a stability must not be overlooked. When the brace strikes the upper rail, it is of advantage to make a notch in the rail to receive the brace, which affords lateral support to the fence. The prolongation of the braces for the reception of a rider, H, is also a novel feature in a post-and-rail fence, and has its advantage. The hinging the braces on a pivot, so as to be movable from one side to the other out of the way, and my dog-stake D E', being of such a nature as to bind the braces and posts in the most effectual manner together combine, simplicity with firmness.

When fancy dictates a portable fence made out of lighter materials, as desirable, this plan is of equal efficacy by using iron pins and staples or hinges to answer the same purpose for removing the stakes to allow of ploughing up close to the fence; but farmers want a practical, substantial, portable fence, which can be made with materials at hand in the shortest time, and with the least labor and expense. These objects are all met, as well as its adaptation to the undulations of the soil. I do not simply claim stakes and braces, as such are common.

What I claim as my improvement, and desire to secure by Letters Patent, is—

1. The dog-stake and pin D E', in combination with the movable brace C and post A, when constructed and arranged as and for the purpose specified.

2. In combination with the above, I claim the rider H, as shown and described.

JAMES M. CLARK.

Witnesses:
   WM. B. WILEY,
   JACOB STAUFFER.